United States Patent
Liu et al.

(10) Patent No.: US 10,411,753 B2
(45) Date of Patent: Sep. 10, 2019

(54) METHOD AND ELECTRONIC APPARATUS FOR TRANSMITTING PACKET WITH CHANGEABLE SPREADING FACTOR

(71) Applicant: MEDIATEK INC., Hsin-Chu (TW)

(72) Inventors: Jianhan Liu, San Jose, CA (US); Chien-Fang Hsu, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/081,968

(22) Filed: Mar. 28, 2016

(65) Prior Publication Data
US 2016/0301445 A1    Oct. 13, 2016

Related U.S. Application Data

(60) Provisional application No. 62/143,909, filed on Apr. 7, 2015.

(51) Int. Cl.
*H04B 1/707*    (2011.01)

(52) U.S. Cl.
CPC ... *H04B 1/707* (2013.01); *H04B 2201/70703* (2013.01)

(58) Field of Classification Search
CPC .......... H04B 1/69; H04B 1/692; H04B 1/707; H04B 1/709; H04B 1/7093; H04B 1/7095; H04B 1/7163; H04B 2201/69; H04B 2201/698; H04B 2201/707; H04B 2201/70703
USPC ............... 375/130, 133, 135, 141, 146, 260; 370/208–210, 349; 342/82
See application file for complete search history.

(56) References Cited

U.S. PATENT DOCUMENTS

| | | | |
|---|---|---|---|
| 9,584,195 B2* | 2/2017 | Cordeiro | H04B 7/0413 |
| 2002/0122469 A1* | 9/2002 | Doetsch | H04J 13/16 375/146 |
| 2002/0159413 A1* | 10/2002 | Tsubouchi | H04B 7/2628 370/335 |
| 2004/0017841 A1* | 1/2004 | Siwiak | H04B 1/7163 375/146 |

(Continued)

FOREIGN PATENT DOCUMENTS

| | | |
|---|---|---|
| CN | 1503463 A | 6/2004 |
| CN | 1588833 A | 3/2005 |

(Continued)

OTHER PUBLICATIONS

Wang Haiming et al., IEEE 802.11aj (45GHz):A New Very High Throughput Millimeter-Wave WLAN System, China Communications, Jun. 2014, pp. 51-62.

*Primary Examiner* — Young T Tse

(57) ABSTRACT

The present invention provides a method and an electronic apparatus for transmitting a packet with changeable spreading factor. The method comprises: utilizing a spreading circuit to select a spreading factor from a plurality of spreading factors according to a transmitting condition to adjust a spreading for the packet; and transmitting the packet. The electronic apparatus comprises: a spreading circuit and a transmitting circuit. The spreading circuit is utilized for selecting a spreading factor from a plurality of spreading factors according to a transmitting condition to adjust the spreading for the packet. The transmitting circuit is coupled to the spreading circuit, and utilized for transmitting the packet.

9 Claims, 4 Drawing Sheets

(56) References Cited

U.S. PATENT DOCUMENTS

| | | |
|---|---|---|
| 2004/0101068 A1 | 5/2004 | Wang |
| 2006/0285604 A1* | 12/2006 | Walton ................. H04L 1/0002 375/267 |
| 2009/0168850 A1* | 7/2009 | Harris ................. H04L 1/0003 375/140 |
| 2010/0080266 A1* | 4/2010 | Zhang ................. H04J 13/102 375/140 |
| 2011/0110410 A1* | 5/2011 | Leiba ................. H04L 1/0003 375/224 |
| 2013/0148576 A1* | 6/2013 | Huang ................. H04W 28/20 370/328 |
| 2016/0261434 A1* | 9/2016 | Hsu ................. H04L 27/0012 |

FOREIGN PATENT DOCUMENTS

| | | |
|---|---|---|
| CN | 1756137 A | 4/2006 |
| CN | 102832963 A | 12/2012 |
| CN | 104012018 A | 8/2014 |

* cited by examiner

| Length | Codes | | Sidelobe level ratio | SNR Gain |
|---|---|---|---|---|
| 2 | +1 -1 | +1 +1 | -6 dB | 3dB |
| 3 | +1 +1 -1 | | -9.5 dB | 4.7dB |
| 4 | +1 +1 -1 +1 | +1 +1 +1 -1 | -12 dB | 6dB |
| 5 | +1 +1 +1 -1 +1 | | -14 dB | 7dB |
| 7 | +1 +1 +1 -1 -1 +1 -1 | | -16.9 dB | 8.4dB |
| 11 | +1 +1 +1 -1 -1 -1 +1 -1 -1 +1 -1 | | -20.8 dB | 10.4dB |
| 13 | +1 +1 +1 +1 +1 -1 -1 +1 +1 -1 +1 -1 +1 | | -22.3 dB | 11.1dB |

FIG. 2

| Field name | Number of Bits | Starting Bit | Description |
|---|---|---|---|
| Reserved | 1 | 0 | Set to 0 (differential detector initialization). |
| Scrambler Initialization | 4 | 1 | Bits of the initial scrambler state |
| Length | 10 | 5 | Number of data octets in the PSDU. Range 14-1023. |
| Packet Type | 1 | 15 | TRN packet type |
| Training Length | 5 | 16 | Length of the training field. |
| Turnaround | 1 | 21 | Set to 1 if the STA is transmitting a packet during an SP or TXOP. |
| Spreading Factor | 2 | 22 | Set to 0: spreading by 13<br>Set to 1: spreading by 7<br>Set to 2: spreading by 4<br>Set to 3: no spreading |
| HCS | 16 | 24 | Header Check sequence. |

FIG. 3

METHOD AND ELECTRONIC APPARATUS FOR TRANSMITTING PACKET WITH CHANGEABLE SPREADING FACTOR

CROSS REFERENCE TO RELATED APPLICATIONS

This application claims the benefit of U.S. Provisional Application No. 62/143,909, filed on Apr. 7, 2015 and included herein by reference.

BACKGROUND

In IEEE 802.11aj specifications, Control physical layer (PHY) is only transmitted in 540 MHz channel. In a conventional Control PHY design and a conventional transmitting method, there is a fixed spreading factor. For example, using a fixed spreading factor, 16, always provides signal-to-noise ratio (SNR) enhancement of 12 dB. Thus, the conventional transmitting method with a fixed spreading factor causes unnecessary high power consumption when a transmitting condition is not bad. In addition, to support up to 10 m Non-line-of-sight (NLOS) transmission, station discovery and beamforming training need Control PHY to work in low SNR environments. Thus, an innovative Control PHY design and transmitting method are required.

SUMMARY

It is therefore one of the objectives of the disclosure to provide a method and an electronic apparatus for provide a Control PHY with low implementation complexity and good performance with lower power consumption, and the spreading factor is changeable for flexible designs and different spectrum efficiency, so as to solve the problem mentioned above.

In accordance with an embodiment of the present invention, a method for transmitting a packet is disclosed. The method comprises: utilizing a spreading circuit to select a spreading factor from a plurality of spreading factors according to a transmitting condition to adjust a spreading for the packet; and transmitting the packet.

In accordance with an embodiment of the present invention, an electronic apparatus for transmitting a packet is disclosed. The electronic apparatus comprises: a spreading circuit and a transmitting circuit. The spreading circuit is utilized for selecting a spreading factor from a plurality of spreading factors according to a transmitting condition to adjust the spreading for the packet. The transmitting circuit is coupled to the spreading circuit, and utilized for transmitting the packet.

Briefly summarized, the method and the electronic apparatus disclosed by the embodiments can provide a Control PHY with low implementation complexity and good performance with lower power consumption, wherein the spreading factor is changeable for flexible designs and different spectrum efficiency.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates a Barker sequence table in accordance with an embodiment of the present invention.

FIG. 3 illustrates a field control PHY header in accordance with an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
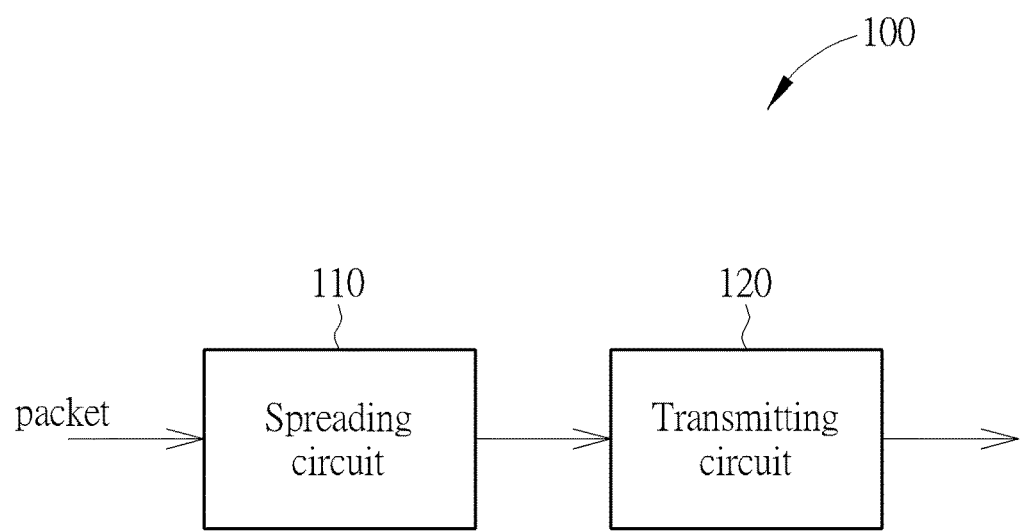
FIG. 1 is a simplified diagram of an electronic apparatus for transmitting a packet in accordance with an embodiment of the present invention.

Please refer to FIG. 1. FIG. 1 is a simplified diagram of an electronic apparatus 100 for transmitting a packet in accordance with an embodiment of the present invention, wherein the electronic apparatus 100 can be a transmitter (TX) of a smartphone or a tablet, and can be applied to 40-50 GHz millimeter wave communication systems, and a packet type of the packet can be control PHY in IEEE 802.11aj specification. However, other electronic device operating at different frequencies or following different standards may also apply. The electronic apparatus 100 comprises: a spreading circuit 110 and a transmitting circuit 120. The spreading circuit 110 is utilized for selecting a spreading factor from a plurality of spreading factors according to a transmitting condition to adjust the spreading for the packet, wherein in the design of the present invention, the spreading can use Barker Sequence which is a finite sequence of N values of +1 and −1 with ideal correlation property since Barker Sequence has the lowest sidelobe level ratio among all binary sequences. In addition, the spreading factor signaling information can be conveyed by a field in the control PHY header, and the spreading factor can be represented with two bits, for example. The transmitting circuit 120 is coupled to the spreading circuit 110, and utilized for transmitting the packet.

For example, please refer to FIG. 2. FIG. 2 illustrates a Barker sequence table in accordance with an embodiment of the present invention. As shown in FIG. 2, the design of the present invention chooses Barker sequence 4, Barker sequence 7, Barker sequence 13 as spreading factors 4, 7, and 13, respectively, wherein the spreading factor 4 provides 6 dB SNR enhancement, and the spreading factor 7 provides 8.4 dB SNR enhancement, and the spreading factor 13 provides 11.1 dB SNR enhancement. In addition, please refer to FIG. 3. FIG. 3 illustrates a field of the control PHY header in accordance with an embodiment of the present invention. As shown in FIG. 3, the spreading factor signaling information is conveyed by the spreading factor field in the control PHY header, wherein the starting bit of the spreading factor is 22, and the number of bits of the spreading factor is 2. Thus, the spreading circuit 110 can select a spreading factor from four spreading factors according to a transmitting condition to adjust the spreading for the packet. For example, if the transmitting condition is good enough without spreading, then the spreading circuit 110 will select the spreading factor of no spreading. If the transmitting condition requires a low SNR gain (such as not higher than 6 dB), then the spreading circuit 110 will select the spreading factor 4 to adjust the spreading for the packet. If the transmitting condition requires a medium SNR gain (such as higher than 6 dB but not higher than 8.4 dB), then the spreading circuit 110 will select the spreading factor 7 to adjust the spreading for the packet. If the transmitting condition requires a high SNR gain (such as higher than 8.4 dB but not higher than 11.1 dB), then the spreading circuit 110 will select the spreading factor 13 to adjust the spreading for the packet.

According to another embodiment of the present invention, the spreading circuit 110 may start with a code with the longest length, such as the code with a length of 13 shown in FIG. 2. The spreading circuit 110 may then use a code with a different length according to the channel condition or the transmitting condition. For example, if the channel condition gets better, a code with a shorter length is used. If the channel condition gets worse or remains the same, the spreading circuit 110 may use a code with the same length or a code with a longer length. However, the adjustment of the length of the code does not have to use the very next code. If the channel condition gets much better, a much shorter code can be used. For example, a code with a length 13 is first used, then a code with a length of 5 or 7 can be used if the channel condition gets much better. Similarly, when a code with a length of 4 is currently used, a code with a length 11 can then be used if the channel condition degrades dramatically. Please note that the above embodiments are only for an illustrative purpose and are not meant to be a limitation of the present invention. For example, the field control PHY header design and the Barker sequence table can be changed according to different design requirements.

In this way, the spreading factor is changeable for flexible designs and different spectrum efficiency in the present invention, and the present invention can provide a Control PHY with low implementation complexity and good performance with lower power consumption.

Figure 4:
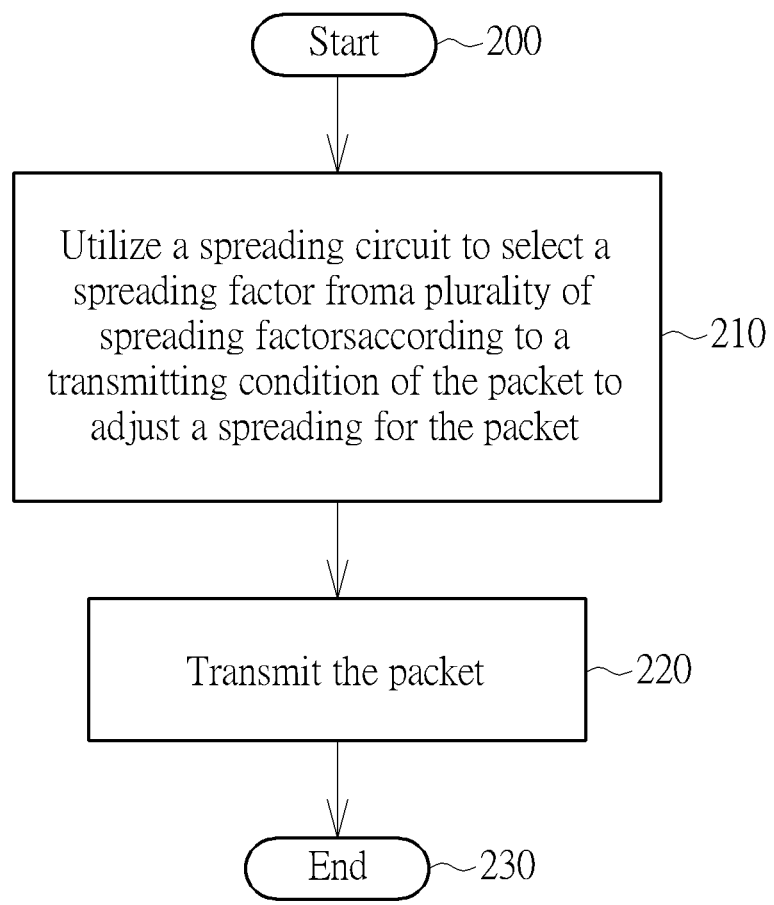
FIG. 4 is an exemplary flowchart showing a method in accordance with operation schemes of electronic apparatus in FIG. 1.

Please refer to FIG. 4. FIG. 4 is an exemplary flowchart showing a method in accordance with operation schemes of electronic apparatus 100 in the above embodiment. Provided that the result is substantially the same, the steps in FIG. 4 are not required to be executed in the exact order shown in FIG. 4. The method in accordance with the above embodiment of the electronic apparatus 100 in the present invention comprises the following steps:

Step 200: Start.

Step 210: Utilize a spreading circuit to select a spreading factor from a plurality of spreading factors according to a transmitting condition to adjust a spreading for the packet.

Step 220: Transmit the packet.

Step 230: End

Briefly summarized, the method and the electronic apparatus disclosed by the embodiments can provide a Control PHY with low implementation complexity and good performance with lower power consumption, wherein the spreading factor is changeable for flexible designs and different spectrum efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting a packet, the method comprising:
for a first portion of the packet, selecting, by a spreading circuit, a first spreading factor from a predetermined set of spreading factors, wherein the predetermined set of spreading factors respectively represent:
a spreading factor indicting no spreading; and
a set of spreading codes of different lengths,
wherein the first spreading factor corresponds to a longest spreading code among the set of spreading codes;
for a second portion of the packet that is subsequent to the first portion, adjusting, by the spreading circuit, spreading for the packet by selecting a second spreading factor that is different than the first spreading factor from the predetermined set of spreading factors based on a transmitting condition with respect to the packet, wherein the packet is a control physical layer (PHY) packet in compliance with IEEE 802.11 family specifications; and
transmitting the packet, wherein the second spreading factor is indicated in the control PHY header of the packet during the transmitting.

2. The method of claim 1, wherein each of the set of spreading codes is a Barker sequence.

3. The method of claim 1, wherein the set of spreading codes consists of Barker sequence 4, Barker sequence 7, and Barker sequence 13.

4. The method of claim 1, wherein the selecting the second spreading factor comprises selecting based on a Signal-Noise-Ratio (SNR) that corresponds to the transmitting condition.

5. A wireless communication device operable to generate a packet for transmission, the device comprising:
a spreading circuit configured to:
for a first portion of the packet, select a first spreading factor from a predetermined set of spreading factors, wherein the predetermined set of spreading factors respectively represent:
a spreading factor indicting no spreading; and
a set of spreading codes of different lengths,
wherein the first spreading factor corresponds to a longest spreading code among the set of spreading codes;
for a second portion of the packet that is subsequent to the first portion, adjust spreading for the packet by selecting a second spreading factor that is different than the first spreading factor from the predetermined set of spreading factors based on a transmitting condition with respect to the packet, wherein the packet is a control physical layer (PHY) packet in compliance with IEEE 802.11 family specifications; and
a transmitting circuit coupled to the spreading circuit and configured to transmit the packet, wherein the second spreading factor is indicated in the control PEW header of the packet during the transmitting.

6. The wireless communication device of claim 5, wherein each of the set of spreading codes is a Barker sequence.

7. The wireless communication device of claim 5, wherein the set of spreading codes consists of Barker sequence 4, Barker sequence 7, and Barker sequence 13.

8. The wireless communication device of claim 5, wherein the spreading circuit is configured to select the second spreading factor based on a Signal-Noise-Ratio (SNR) gain that corresponds to the transmitting condition.

9. The wireless communication device of claim 5, wherein the spreading circuit and the transmitting circuit are comprised in a transmitter that is a 40-50 GHz millimeter wave communication device.

\* \* \* \* \*